US010742099B2

(12) United States Patent
Broadbridge (10) Patent No.: US 10,742,099 B2
(45) Date of Patent: Aug. 11, 2020

(54) ARRANGEMENT FOR MOUNTING A MAGNET TO AN ELECTRIC MACHINE

(71) Applicant: PROTEAN ELECTRIC LIMITED, Surrey (GB)

(72) Inventor: Samuel Broadbridge, Hampshire (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 410 days.

(21) Appl. No.: 15/567,323

(22) PCT Filed: Apr. 20, 2016

(86) PCT No.: PCT/IB2016/052240
§ 371 (c)(1),
(2) Date: Oct. 17, 2017

(87) PCT Pub. No.: WO2016/170483
PCT Pub. Date: Oct. 27, 2016

(65) Prior Publication Data
US 2018/0152085 A1    May 31, 2018

(30) Foreign Application Priority Data
Apr. 21, 2015 (GB) .................................. 1506792.9

(51) Int. Cl.
*H02K 15/00* (2006.01)
*H02K 15/03* (2006.01)

(52) U.S. Cl.
CPC ........ *H02K 15/03* (2013.01); *Y10T 29/49009* (2015.01)

(58) Field of Classification Search
CPC .......... H02K 15/03; H02K 21/22; H02K 7/14; H02K 11/30; H02K 1/28; Y10T 29/49009; Y10T 29/49012
(Continued)

(56) References Cited

U.S. PATENT DOCUMENTS

| 4,608,752 A * | 9/1986 | Muller ................... H02K 1/278 29/598 |
| 7,882,613 B2 * | 2/2011 | Barthelmie ............ H02K 15/03 29/527.1 |

(Continued)

FOREIGN PATENT DOCUMENTS

| CN | 103490570 A | 1/2014 |
| DE | 102004039807 A1 | 2/2006 |

(Continued)

OTHER PUBLICATIONS

European Patent Office, International Search Report, dated Aug. 18, 2016, World Intellectual Property Organization, Rijswijk.
(Continued)

*Primary Examiner* — Donghai D Nguyen
(74) *Attorney, Agent, or Firm* — Nolte Intellectual Property Law Group (57) ABSTRACT

An apparatus for mounting a magnet to a rotor or stator of an electric machine includes a mounting element having a second mounting surface, wherein the mounting element is arranged to magnetically interact with the magnet to allow a magnetic force to magnetically attach the magnet to the second mounting surface; means for moving the mounting element having the magnet magnetically attached to the second mounting surface to a predetermined distance from a first mounting surface of the rotor or stator; and means for moving the mounting element away from the first mounting surface when the mounting element is at the predetermined distance from the first mounting surface. The apparatus further includes means for varying the flux density between the mounting element and the magnet.

18 Claims, 7 Drawing Sheets

(58) Field of Classification Search
USPC .......................................... 29/596, 598, 830
See application file for complete search history.

(56) References Cited

U.S. PATENT DOCUMENTS

| | | | |
|---|---|---|---|
| 8,826,516 B2 * | 9/2014 | Bopple | ................. H02K 15/03 |
| | | | 29/469 |
| 2005/0246886 A1 | 11/2005 | Morel | |
| 2008/0061635 A1 | 3/2008 | Saitou et al. | |

FOREIGN PATENT DOCUMENTS

| | | |
|---|---|---|
| EP | 1826889 A1 | 8/2007 |
| EP | 2192674 A1 | 6/2010 |
| EP | 2381563 A2 | 10/2011 |
| JP | 2005151734 A | 6/2005 |

OTHER PUBLICATIONS

European Patent Office, Written Opinion of the ISR, dated Oct. 27, 2016, World Intellectual Property Organization, Munich.
Intellectual Property Office, Exam Report, dated May 22, 2017, Intellectual Property Office, South Wales.
Intellectual Property Office, Search and Exam Report, dated Jun. 26, 2015, Intellectual Property Office, South Wales.
Intellectual Property Office, Search Report, dated Jun. 25, 2015, Intellectual Property Office, South Wales.

* cited by examiner

ARRANGEMENT FOR MOUNTING A MAGNET TO AN ELECTRIC MACHINE

The present invention relates to a magnet mounting arrangement, in particular an arrangement for mounting a magnet to an electric machine.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reluctance motor and synchronous slip ring motor, which have a rotor and a stator, as is well known to a person skilled in the art.

The rotor for a permanent magnet motor typically includes a plurality of permanent magnets, where the plurality of permanent magnets is mounted on or in a rotor back-iron such that the magnetic field alternates in polarity around the circumference of the rotor. As the rotor rotates relative to the stator the plurality of permanent magnets are arranged to sweep across the ends of coil windings mounted on the stator as the rotor rotates relative to the stator. Appropriate switching of currents in the coil windings allows synchronized attraction and repulsion of the poles of the permanent magnets to produce rotation or the rotor.

As the force on the current carrying wire, and consequently the torque for an electric motor, is proportional to the flux density of a magnetic field it is desirable for a synchronous permanent magnet traction motor, where torque is an important criterion for the motor, to use magnets with as high a flux density as possible.

Consequently, rare earth magnets, which produce significantly stronger magnetic fields than other types of magnets, are commonly used within synchronous permanent magnet electric motors.

However, due to the significantly stronger magnetic fields produced by rare earth magnets, the placement of rare earth magnets in a rotor during its manufacture can be problematic. For example, when attaching a magnet to a rotor back-iron, the attractive force between the magnet and rotor back-iron can cause the magnet to collide with the back-iron resulting in damage to the magnet. Similarly, when attempting to mount a magnet to a specific location on a rotor back-iron, magnetic interaction with other magnets already mounted on the rotor can make the accurate placement of the magnet difficult.

It is desirable to improve this situation.

In accordance with an aspect of the present invention there is provided an arrangement and method for mounting a magnet to a rotor or stator of an electric machine according to the accompanying claims.

The magnetic force between a magnet and a mounting element upon which the magnet is mounted, is selected to be less than the magnetic force between the magnet and the region of the rotor or stator to which the magnet is to be mounted, such that when the magnet is brought into contact with the rotor or stator the difference in magnetic force between the magnet and the mounting element and the magnet and the rotor or stator is sufficient to allow the magnet to be retained to the rotor or stator when the mounting element is moved away, while avoiding the magnet jumping from the mounting element to the rotor or stator. In other words, the differential in magnetic force between the magnet with respect to the mounting element and the rotor/stator is sufficient to allow the magnet to be retained on the rotor/stator when brought into contact with the rotor/stator when the magnet is mounted on the mounting element but insufficient to allow the magnet to jump from the mounting element to the rotor/stator when the magnet is brought into contact with the rotor/stator.

This has the advantage of minimising damage to the magnet when being mounted to the rotor or stator, while allowing accurate placement of the magnet on the rotor or stator.

The present invention will now be described, by way of example, with reference to the accompanying drawings, in which.

For the purposes of the present embodiment, a magnet mounting arrangement is described for mounting a plurality of magnets to a rotor, for example a rotor for an electric motor or generator. However, the present magnet mounting arrangement may also be used for mounting magnets to the complementary electric machine component, the stator.

Figure 1:
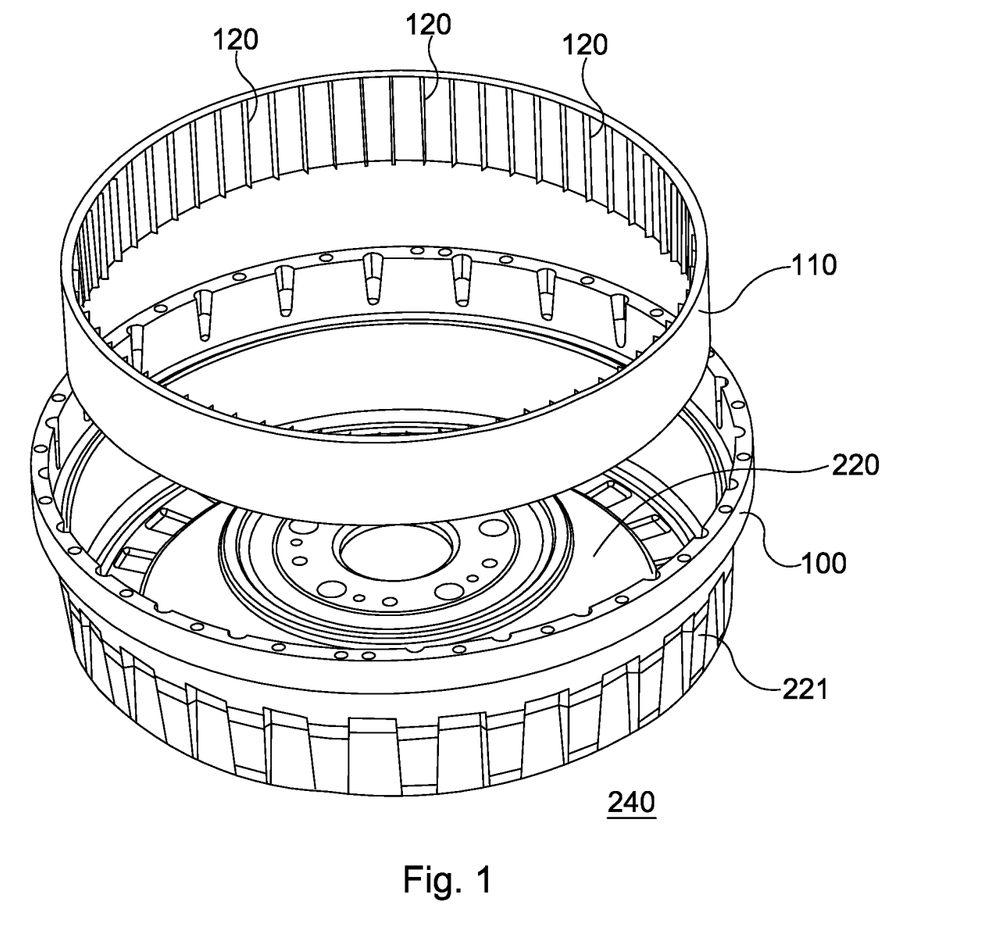
FIG. 1 illustrates an exploded view of a rotor according to an embodiment of the present invention.

For the purpose of the present embodiment, FIG. 1 illustrates an exploded view of an embodiment of a rotor 240 having a rotor housing 100 and back-iron 110 in which a plurality of magnets, for example rare earth magnets, are to be mounted. Although the present embodiment describes the mounting of a plurality of magnets to a back-iron mounted within a rotor housing, equally the plurality of magnets may be mounted directly to the rotor housing. Similarly, any form of rotor or stator may be used.

As illustrated in FIG. 1, the rotor housing 100 comprises a radial/front portion 220 and a cylindrical portion 221, where the cylindrical portion 221 acts as a rotor rim. Preferably, the radial portion 220 is arranged to be rotatably mounted to a stator using a bearing block.

In the present embodiment, the cylindrical portion 221 of the rotor housing 110 is arranged to axially extend over stator teeth formed on the stator (not shown), thereby substantially surrounding the stator. For reduced weight, the rotor housing 100 is preferably manufactured from aluminium or an alloy of aluminium.

Figure 2:
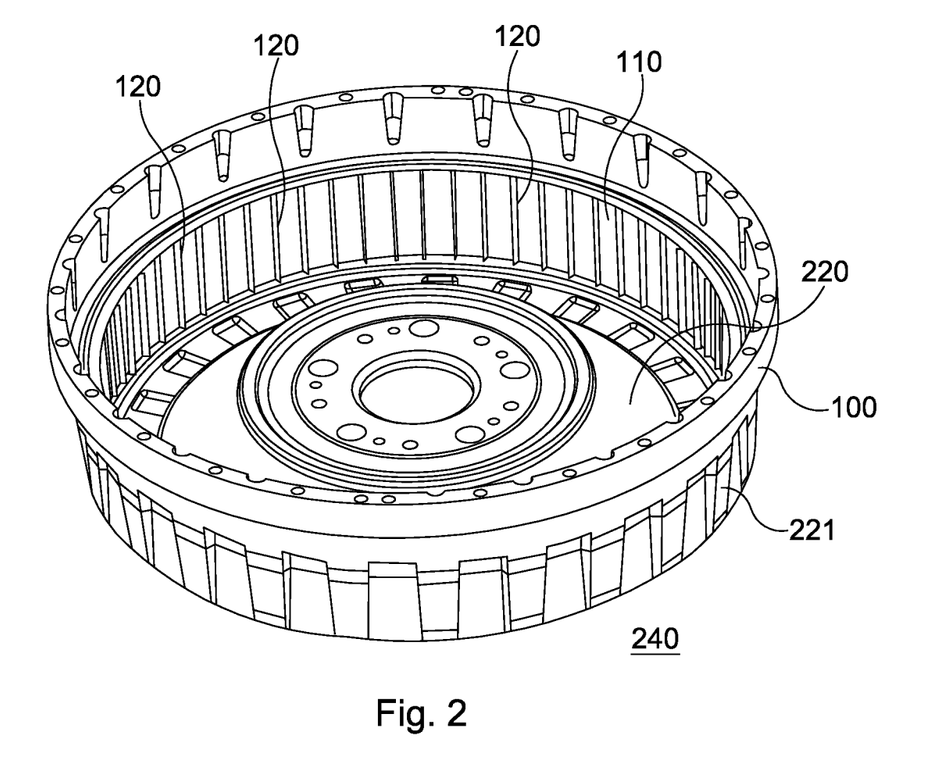
FIG. 2 illustrates a rotor according to an embodiment of the present invention.

The ring shaped back-iron 110 is mounted within the cylindrical portion 221 of the rotor housing 100, as illustrated in FIG. 2. Typically the back-iron 110 is made from material having a high permeability, thereby allowing a magnetic field to be formed within the back-iron for increasing magnetic flux. Examples of materials used for the back-iron include iron or electrical steel (also known as lamination steel, silicon steel or transformer steel). Preferably the back-iron is formed from a series of laminations, which may be formed by stamping the desired shape from thin sheets of material, which may typically have a thickness of around 0.35 mm.

Preferably, the back-iron is mounted within the cylindrical portion 221 of the rotor housing 100 in a manner that prevents the relative rotation of the rotor housing 100 with respect to the back-iron 110, for example an interference fit and/or use of an adhesive.

As illustrated in FIGS. 1 and 2, the inner circumference of the back-iron 110 includes a plurality of ridges 120 extending from the axially inner and outer surface of the back-iron 110, where the ridges 120 project in a radial inward direction. The ridges 120 act as a spacer between magnet elements mounted on the inner circumference of the back-iron 110 that can also be used to facilitate the alignment of magnets mounted on the back-iron 110. As described below, a magnet is arranged to be mounted in between a pair of ridges 120 with adjacent magnets having alternate magnetic polarity.

Each magnet mounted between a pair of back-iron ridges 120 act as a pole of the electric motor, where as stated above, each adjacent pole of the electric motor has an opposite magnetic polarity to the next. Although the electric motor may include any number of poles, for the purposes of the present embodiment, for a rotor having a diameter of 18 inches preferably the rotor includes 64 poles, that is to say 64 magnets. However, any number of magnets may be used.

Although a single magnet may be mounted between a pair of back-iron ridges 120, in a preferred embodiment a plurality of magnet elements having the same magnetic polarity are coupled together, which together act as a single magnet. The plurality of magnet elements are mounted to the rotor back-iron in a single operation, as described below.

A mounting arrangement for mounting the plurality of magnets to the inner circumferential surface of the rotor back-iron 120 will now be described; where for the purposes of the present embodiment each of the plurality of magnets comprises a plurality of magnet elements of the same magnetic polarity that have been connected together.

Figure 3:
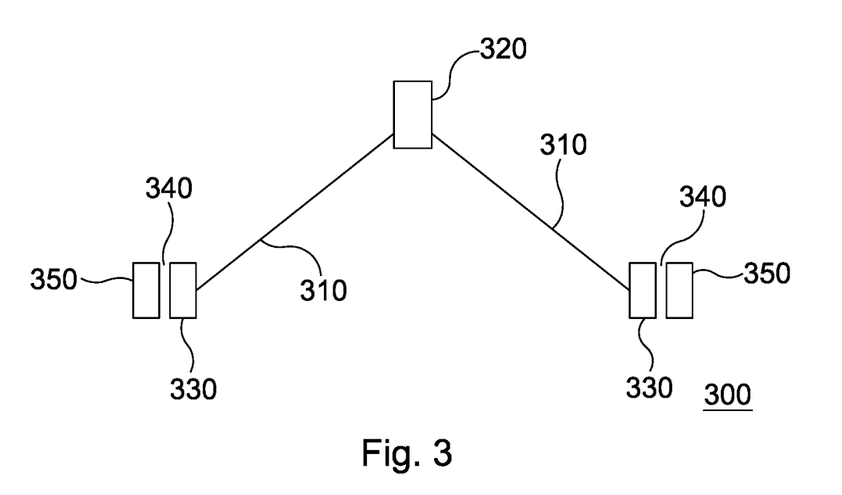
FIG. 3 illustrates a mounting arrangement according to an embodiment of the present invention.

As illustrated in FIG. 3, the mounting arrangement 300 includes two mounting arms 310, where one end of each of the mounting arms 310 is pivotally connected to a coupling member 320 to allow each mounting arm 310 to pivot with respect to the coupling member 320.

Each mounting arm 310 extends from the coupling member 320 in opposite directions with respect to each other to form an inverted V configuration, where each mounting arm 310 is arranged to pivot between a first position and a second position. For the purposes of the present embodiment, the first position corresponds to a smaller pivot angle with respect to a vertical line through the coupling member 320 than that for the second position.

Coupled at the opposite end of each mounting arm 310 to that of the coupling member 320 is a mounting element 330. Each mounting element 330 includes a mounting surface 340 for mounting a magnet 350, as described below. Preferably, the mounting surface 340 of each of the mounting elements 330 is arranged to extend in substantially a vertical direction when the mounting arm 310 they are coupled to is placed in the second position. Although the present embodiment describes the mounting arm 319 and the mounting element 330 as separate elements, equally the mounting arm 310 and mounting element 330 can be formed as a single component.

In a first embodiment, each mounting element 330 is pivotally coupled to their respective mounting arm 310 such that when the mounting arms 310 are pivotally moved between the first and second position the respective mounting elements 330 pivot with respect to their respective mounting arm 310 to allow the respective mounting surfaces 340 of the mounting elements 330 to remain in a substantially vertical direction.

In a second embodiment, the position of the respective mounting elements 330 is fixed relative to the mounting arm 310 they are coupled to, such that when the mounting arms 310 are in their first position the respective mounting surfaces 340 of the mounting elements 330 are inclined at a non-vertical angle. However, when the mounting arms 310 are placed in their second position the respective mounting surfaces 340 of the mounting elements 330 are arranged to extend in a substantially vertical direction.

However, any orientation of the mounting surfaces 340 may be used.

To allow the mounting arrangement 300 to mount a magnet 350 onto the inner circumferential surface of the rotor back-iron 110, a magnet 350 is placed on the mounting surfaces 340 of each of the respective mounting elements 330. If the mounting arms 310 are not already so located, the mounting arms 310 are then placed in the first position.

As stated above, each of the mounting elements 330 is arranged to magnetically interact with a magnet 350, thereby allowing the magnetic interaction between a magnet 350 and the mounting element 330 to retain a magnet 350 to the respective mounting surfaces 340 of the mounting elements 330.

Any suitable means for generating the magnetic force may be used. In a first embodiment, the mounting element 330 includes material having a high permeability that allows a magnetic force to be generated between the magnet 350 and the mounting element 330.

In a second embodiment, the mounting arrangement 300 includes an electromagnet configured to generate a magnetic field that interacts with that of the magnet 350, resulting in the magnet 350 being retained to the mounting surface 340 of the mounting element 330.

The mounting element 330 is configured so that, preferably, the magnetic force between the magnet 350 and the mounting element 330, when the magnet 350 is mounted on a mounting element 330, is less than the magnetic force between the magnet 350 and the rotor back-iron 110, when the magnet 350 is mounted on the rotor back-iron 110. However, the differential in magnetic force between the magnet 350 and the mounting element 330 and the magnet 350 and the rotor back-iron 110 is less than a value that would cause the magnet 350 to jump from the mounting element 330 to the rotor back-iron 110 when the magnet 350 is greater than a predetermined distance from the rotor back-iron 110.

Any suitable means for adjusting the magnetic characteristics of the mounting element to achieve this result may be used.

For example, in an embodiment where the mounting element 330 includes material having a high permeability, the distance between the mounting surface 340 of the mounting element 330 and the material having a high permeability may be varied, thereby allowing the magnetic force between the magnet and the mounting element to be varied. In this embodiment, the mounting element 330 may include an adjustment mechanism for allowing the distance between the mounting surface 340 of the mounting element 330 and the material having a high permeability to varied, thereby allowing the flux density of the magnetic field between the magnet 350 and the material having a high permeability to be varied. Alternatively, the amount of material having a high permeability may be varied.

Similarly, in the embodiment where the mounting element 330 includes an electromagnet, the magnetic field generated by the electromagnet may be varied.

The magnetic characteristics between a magnet 350 and the mounting element 330 to derive a suitable value for allowing a magnet 350 to be mounted to the rotor back-iron 110 without damaging a magnet during the transfer from the mounting element 330 to the rotor back-iron 110 may be determined by any suitable means, for example using trial and error, or magnetic calculations.

Although in a preferred embodiment, the magnetic characteristics of the mounting element 330 are configured prior to a magnet 350 being mounted to a rotor back-iron 110 and do not substantially change during the magnet mounting process, in an alternative embodiment the magnetic characteristics of the mounting element 330 can be changed dynamically during the magnet mounting process.

For example, the magnetic force between a magnet 350 and the mounting element 330 can be selected to ensure that the magnet 350 is retained to the mounting element 330 during the process of bringing the magnet 350 into contact with the rotor back-iron 110. Once the magnet 350 is in contact with the rotor back-iron 110 the magnetic force between the magnet 350 and the mounting element 330 is reduced, for example by reducing the magnetic flux generated by an electromagnet mounted on the mounting element 330.

Figure 4:
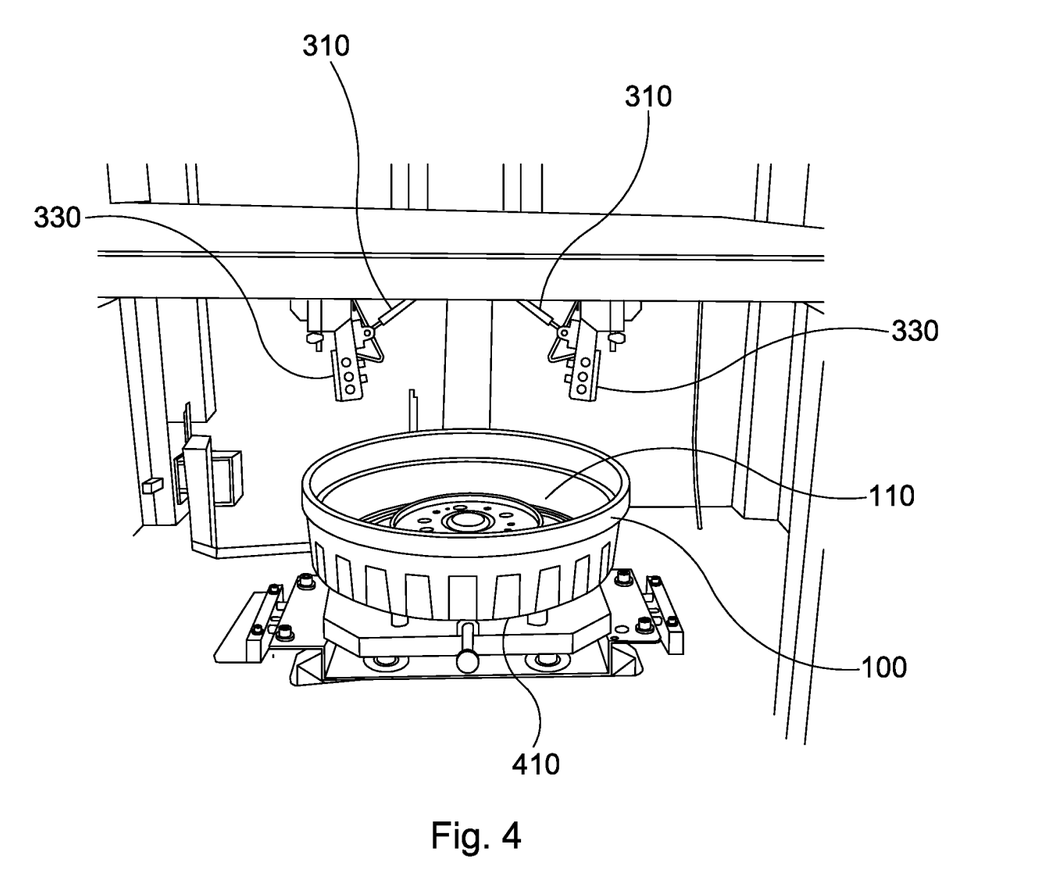
FIG. 4 illustrates a mounting arrangement according to an embodiment of the present invention.

To allow a plurality of magnets 350 to be mounted on the rotor back-iron 110, preferably the rotor housing 100 and rotor back-iron 110 are mounted on an indexing table 410 that is located below the mounting arms 310. The indexing table 410 is arranged to fix the rotational position of the rotor 240 relative to the pair of mounting arms 310.

As described above, each of the respective mounting arms 310 are arranged to mount a magnet 350 between a pair of ridges 120 formed on the rotor back-iron 110, where magnets mounted by the pair of mounting arms 310 are mounted on diametrically opposite positions on the rotor back-iron 110. Once a pair of magnets 350 has been mounted on the rotor back-iron 110 the indexing table 410, and correspondingly the rotor 240, is rotated to allow an adjacent pair of back-iron ridges 120 to align with a respective mounting arm 310, thereby allowing another pair of magnets 350 to be mounted on the rotor back-iron 110 adjacent to the previously mounted magnets 350.

The indexing table 410 and the rotor 240 are raised to a height that allows the mounting elements 330, with magnets 350 mounted on the respective mounting surfaces 340, to axially extend within the cylindrical portion 221 of the rotor 240. As stated above, during the positioning of the respective mounting elements 330 within the cylindrical portion 221 of the rotor 240, the respective mounting arms 310 are located in their first position such that the magnets 350 mounted on the respective mounting surface 340 are positioned radially inwards from the inner-surface of the rotor back-iron 110.

Once the rotor 240 has reached the required height the mounting arms 310 are arranged to move to their second position. Moving the mounting arms 310 to their second position causes the magnets 350 mounted on the respective mounting elements 330 to be brought adjacent to the inner surface of the rotor back-iron 110, preferably at a distance that results in the magnets being retained on the inner surface of the rotor back-iron 110, between a pair of rotor back-iron ridges 120.

Preferably, when the mounting arms 310 are placed in the second position, the mounting surfaces 340 of the respective mounting elements 330 are substantially parallel to the inner circumferential surface of the rotor back-iron 110, which in the present embodiment would be substantially vertical. Placing the mounting surface 340 of each of the mounting elements 330 parallel to the inner circumferential surface of the rotor back-iron 110 allows all regions of the magnet mounting surface 340 to be brought towards the inner circumferential surface of the rotor back-iron 110 at an equal distance from their closest point on the inner circumferential surface of the rotor back-iron 110. Consequently, the magnetic forces exerted on all regions of the magnet mounting surface resulting from being in close proximity to the rotor back-iron 110 will be substantially the same.

Once the magnets 350 are magnetically retained to the rotor back-iron 110 the mounting arms 310 are arranged to retract from the inner surface of the rotor back-iron 110 by moving from their second position to their first position.

The rotor 240 and indexing table 410 is lowered and new magnets 350 are placed on a respective mounting surface 340 located on the respective mounting elements 330. The indexing table 410 is rotated so that the next pair of back-iron ridges 120 aligns with the respective mounting arms 310 when the indexing table 410 and the rotor 240 are raised to a height that results in the mounting elements 330 axially extending within the cylindrical portion 221 of the rotor 240. The new set of magnets 350 are then mounted to the rotor back-iron 110 in the same manner as described above.

This process is repeated to mount as many magnets 350 as required.

Figure 5A:
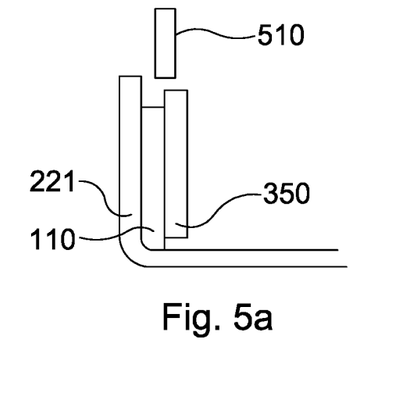
FIGS. 5a and 5b illustrate a mounting arrangement according to an embodiment of the present invention.

In a preferred embodiment, to increase the accuracy of axial alignment of the magnet 350 with respect to the inner axial surface of the rotor back-iron 110, the mounting arrangement 300 is configured to mount a magnet 350 to the rotor back-iron 110 with the top of the magnet 350 extending a small distance above the inner axial surface of the rotor back-iron, as illustrated in FIG. 5a.

Figure 5B:
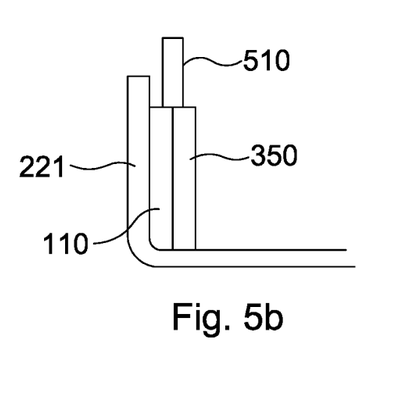

Once the magnet 350 has been mounted to the rotor back-iron 110, and preferably before the mounting arms 310 have moved completely away from the rotor back-iron 110, a positioning device 510, which is preferably mounted on either the mounting arm 310 or mounting element 330, is arranged to exert a force on the top of the magnet 350 resulting in the top of the magnet 350 being pushed flush with the inner axial surface of the rotor back-iron 110, as illustrated in FIG. 5b. In a preferred embodiment, the positioning device 510 is arranged to partly extend, in a radial direction, over the inner axial surface of the rotor back-iron 110 and the inner axial surface of the upper magnet surface, as illustrated in FIG. 5a and FIG. 5b. Upon the positioning device 510 pushing the top of the magnet 350 towards the inner axial surface of the rotor back-iron 110, the positioning device 510 is arranged to retract when the bottom of the positioning device 510 comes into contact with the rotor back-iron 110, thereby ensuring that the upper magnet surface for each of the magnets 350 mounted on the rotor back-iron 110 align with the inner axial surface of the rotor back-iron 110.

In a preferred embodiment, to aid retention of a magnet 350 on the rotor back-iron 110 an adhesive is applied between the magnet 350 and the rotor back-iron 110 prior to the magnet 350 being mounted on the rotor back-iron 110. For example, an adhesive is applied to the inner circumferential surface of the rotor back-iron 110 prior to a magnet 350 being mounted on the surface with a curing agent applied to the complementary surface of the magnet 350 to be mounted to the rotor back-iron 110, thereby allowing the curing agent to cure the adhesive when the magnet 350 is mounted on the rotor back-iron 110.

Figure 6:
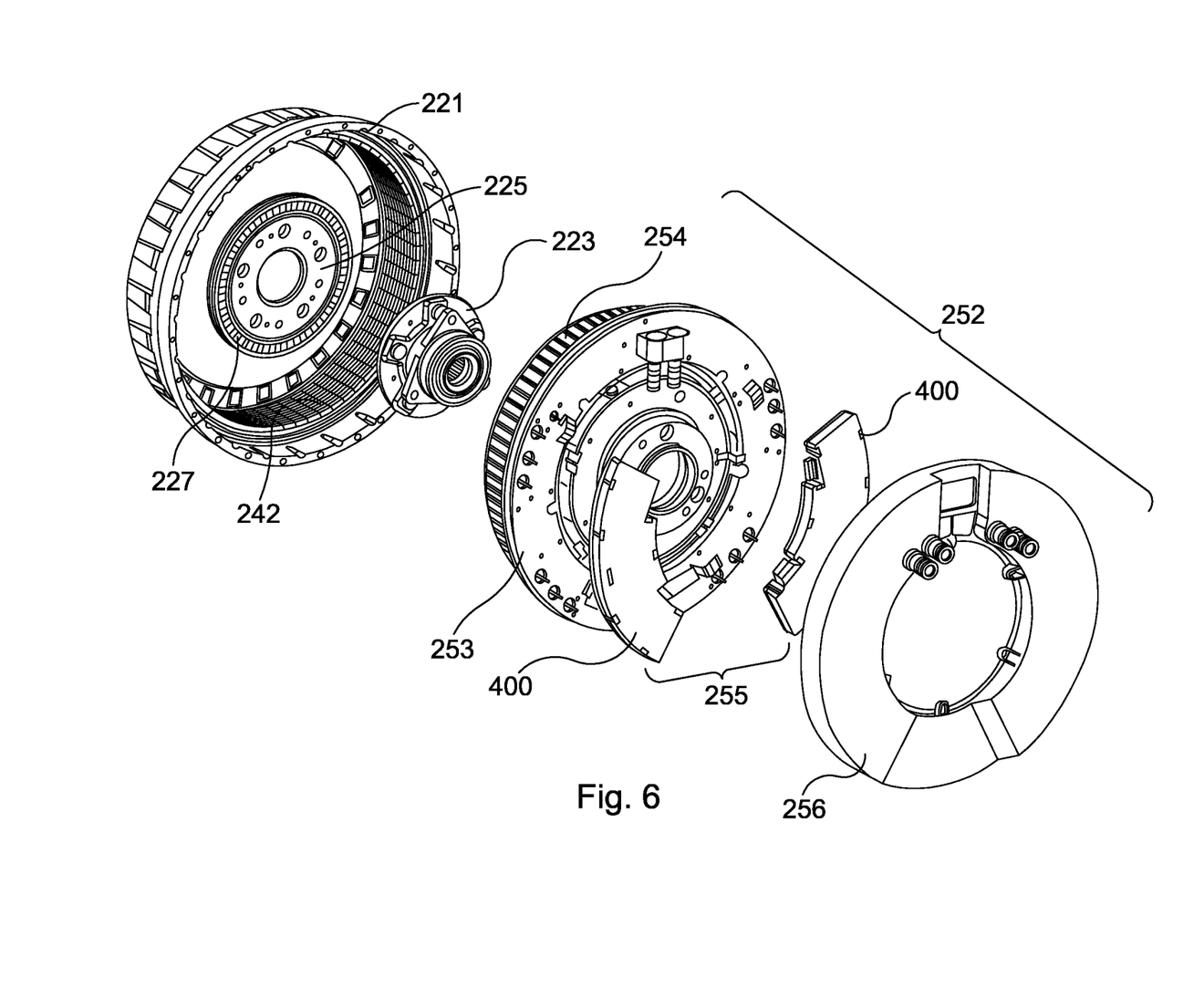
FIG. 6 illustrates a first perspective view of an electric motor.
Figure 7:
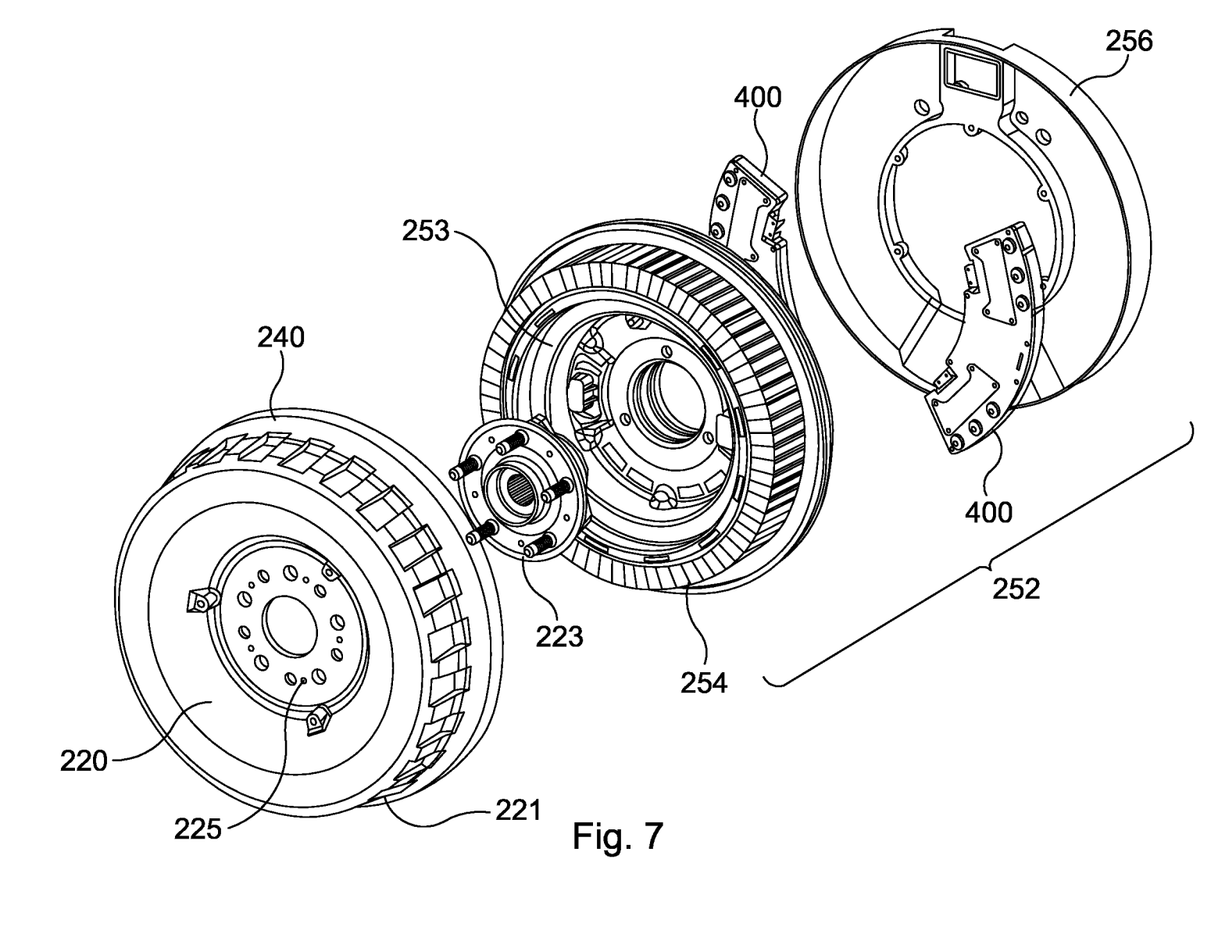
FIG. 7 illustrates a second perspective view of an electric motor.

For purposes of illustration, FIG. 6 and FIG. 7 illustrate an in-wheel electric motor incorporating a rotor assembled in accordance with the present invention.

FIG. 7 shows an exploded view of the same assembly as FIG. 6 from the opposite side.

Preferably the in-wheel electric motor includes a stator assembly 252 and the rotor assembly 240. The stator assembly 252 comprising a heat sink 253 having a cooling channel, multiple coils 254, an electronics module 255 mounted in a rear portion of the stator for driving the coils, and a capacitor (not shown) mounted on the stator within a recess 257 formed on the rear portion of the stator. In a preferred embodiment the capacitor is an annular capacitor element.

The coils 254 are formed on stator tooth laminations to form coil windings. A stator cover 256 is mounted on the rear portion of the stator 252, enclosing the electronics module 255 to form the stator assembly 252, which may then be fixed to a vehicle and does not rotate relative to the vehicle during use.

The electronics module 255 includes two control devices 400, where each control device 400 includes an inverter and control logic, which in the present embodiment includes a processor, for controlling the operation of the inverter.

As described above, the rotor 240 includes a rotor back-iron 110 mounted within a rotor housing having a front portion 220 and a cylindrical portion 221, where the cylindrical portion is arranged to substantially surround the stator assembly 252.

The magnets mounted on the inner circumferential surface of the rotor back-iron 110 are arranged to be in close proximity to the coil windings on the stator 252 so that magnetic fields generated by the coils interact with the magnets 350 arranged around the inside of the cylindrical portion 221 of the rotor assembly 240 to cause the rotor assembly 240 to rotate. As the permanent magnets 350 are utilized to generate a drive torque for driving the electric motor, the permanent magnets are typically called drive magnets.

The rotor 240 is attached to the stator 252 via a bearing arrangement that includes a bearing block 223 and a sealing element (not shown). The bearing block 223 can be a standard bearing block as would be used in a vehicle to which this motor assembly is to be fitted.

The invention claimed is:

1. An apparatus for mounting a magnet to a rotor or stator of an electric machine, wherein the rotor or stator is arranged to magnetically interact with the magnet to allow a magnetic force to magnetically attach the magnet to a first mounting surface on the rotor or stator, the apparatus comprising:
a mounting element having a second mounting surface, wherein the mounting element is arranged to magnetically interact with the magnet to allow a magnetic force to magnetically attach the magnet to the second mounting surface;
means for moving the mounting element having the magnet magnetically attached to the second mounting surface to a predetermined distance from the first mounting surface of the rotor or stator;
means for moving the mounting element substantially perpendicular away from the first mounting surface when the mounting element is at the predetermined distance from the first mounting surface, wherein the magnetic force exerted between the magnet and the mounting element and the magnet and the rotor or stator is arranged to allow the magnetic force between the rotor or stator and the magnet to retain the magnet to the first mounting surface when the mounting element is moved away from the first mounting surface; and
means for varying the flux density between the mounting element and the magnet.

2. The apparatus according to claim 1, wherein the means for moving the mounting element is arranged to move the mounting element towards the first mounting surface in a manner where the first mounting surface and the second mounting surface are substantially parallel with respect to each other.

3. The apparatus according to claim 1, further comprising a plurality of mounting elements, wherein each of the plurality of mounting elements are arranged to mount a respective magnet to the rotor or stator.

4. The apparatus according to claim 1, wherein the rotor or stator includes a back-iron, wherein the first mounting surface is formed on the back-iron.

5. The apparatus according to 4, wherein the back-iron is made from electrical steel.

6. The apparatus according to claim 4, wherein adhesive is applied to the back-iron and a curing agent is applied to the magnet.

7. The apparatus according to claim 4, wherein adhesive is applied to the magnet and a curing agent is applied to the back-iron.

8. The apparatus according to claim 1, wherein the flux density between the mounting element and the magnet is varied by moving an electrical steel component within the mounting element relative to the second mounting surface.

9. The apparatus according to claim 1, wherein the flux density between the mounting element and the magnet is varied by varying the flux density of an electro magnet associated with the mounting element.

10. The apparatus according to claim 1, wherein the mounting element is moved away from the first mounting surface in a radial direction of the rotor or stator.

11. The apparatus according to claim 1, wherein the mounting element is moved away from the first mounting surface in an axial direction of the rotor or stator.

12. The apparatus according to claim 1, further comprising an indexing table, wherein the rotor or stator is arranged to be placed on the indexing table to allow a sequence of magnets to be mounted around the rotor or stator at locations determined by the indexing of the indexing table.

13. The apparatus according to claim 1, further comprising means for axially aligning the magnet on the rotor or stator.

14. The apparatus according to claim 13 wherein the means for axially aligning the magnet includes an element arranged to apply an axial force to the magnet when the magnet is mounted on the first surface to place the magnet at a predetermined axial position on the first surface.

15. A method for mounting a magnet to a rotor or stator of an electric machine, wherein the rotor or stator is arranged to magnetically interact with the magnet to allow a magnetic force to magnetically attach the magnet to a first mounting surface on the rotor or stator, the method comprising magnetically attaching the magnet to a second mounting surface formed on a mounting element; moving the mounting element having the magnet magnetically attached to the second mounting surface to a predetermined distance from the first mounting surface of the rotor or stator; varying the flux density between the mounting element and the magnet; and moving the mounting element substantially perpendicularly away from the first mounting surface when the mounting element is at the predetermined distance from the first mounting surface, wherein the magnetic force exerted between the magnet and the mounting element and the magnet and the rotor or stator is arranged to allow the magnetic force between the rotor or stator and the magnet to retain the magnet to the first mounting surface when the mounting element is moved away from the first mounting surface.

16. A method according to claim 15, further comprising moving the mounting element towards the first mounting surface in a manner where the first mounting surface and the second mounting surface are substantially parallel with respect to each other.

17. A method according to claim 15, further comprising moving the mounting element away from the first mounting surface in a radial direction of the rotor or stator.

18. A method according to claim 15, further comprising moving the mounting element away from the first mounting surface in an axial direction of the rotor or stator.

* * * * *